(12) United States Patent
Harris

(10) Patent No.: US 8,336,122 B1
(45) Date of Patent: Dec. 25, 2012

(54) METHOD OF MANUFACTURING A CRANIAL SHOCK ABSORPTION SYSTEM

(76) Inventor: Kerry S. Harris, San Antonio, TX (US)

( * ) Notice: Subject to any disclaimer, the term of this patent is extended or adjusted under 35 U.S.C. 154(b) by 278 days.

(21) Appl. No.: 12/883,787

(22) Filed: Sep. 16, 2010

(51) Int. Cl.
    *A42B 3/00*     (2006.01)
    *A42B 3/10*     (2006.01)
    *B32B 3/00*     (2006.01)

(52) U.S. Cl. ............ 2/412; 29/527.1; 29/527.2; 29/458; 264/154; 264/313; 264/316; 2/413; 2/414

(58) Field of Classification Search ............ 29/458, 29/527.1, 527.2; 264/154, 313, 316; 2/412, 2/413, 414
See application file for complete search history.

(56) References Cited

U.S. PATENT DOCUMENTS

| | | | | |
|---|---|---|---|---|
| 3,761,959 A | * | 10/1973 | Dunning | 2/413 |
| 5,035,009 A | * | 7/1991 | Wingo et al. | 2/414 |
| 5,263,203 A | * | 11/1993 | Kraemer et al. | 2/413 |
| 6,226,801 B1 | * | 5/2001 | Alexander et al. | 2/413 |
| 6,485,690 B1 | * | 11/2002 | Pfost et al. | 422/552 |
| 8,039,078 B2 | * | 10/2011 | Moore et al. | 428/76 |
| 2005/0165445 A1 | * | 7/2005 | Buckman et al. | 606/213 |
| 2010/0186150 A1 | * | 7/2010 | Ferrara et al. | 2/412 |

* cited by examiner

*Primary Examiner* — Derris Banks
*Assistant Examiner* — Anthony Green
(74) *Attorney, Agent, or Firm* — Gunn, Lee & Cave, P.C.

(57) ABSTRACT

A method of manufacturing a cranial shock absorption system. The method is comprised of forming a first layer of elastomer, positioning a thin layer of material on top surface of elastomer such that the top surface is exposed around the entire exterior of the layer of material, allowing the first layer to partially set, positioning a tubular stem or valve on the first layer adjacent to the layer of material, forming a second layer of elastomer, allowing the first layer and second layer of elastomer to fully set around the thin layer of material, removing the thin layer of material from between the first and second layers of elastomer and then introducing a fluid into the chamber through the tubular stem.

20 Claims, 10 Drawing Sheets

METHOD OF MANUFACTURING A CRANIAL SHOCK ABSORPTION SYSTEM

CROSS-REFERENCES TO RELATED APPLICATIONS

Not applicable

STATEMENT REGARDING FEDERALLY SPONSORED RESEARCH OR DEVELOPMENT

Not applicable.

BACKGROUND OF THE INVENTION

1. Field of the Invention

The present invention relates to protective head covering. More specifically, the present invention is a shock absorption system and that includes at least one silicone or thermoplastic elastomer bladder.

2. Description of the Related Art

Shock absorption systems are used for a variety of purposes, including safety equipment, helmets, body armor, padding, and other devices that are intended to reduce or prevent bodily injury. Conventional techniques and methods include molded plastics, foam, rubber, or other solid or semi-solid materials that absorb concussive forces or shock. For example, law enforcement helmets, military ballistic helmets, sports helmets, motorcycle helmets, riot helmets, and safety helmets often use expanded polystyrene or permeable foam covered with a hardened shell or other exotic fibers that, after being subjected to an impact or concussive force, must be replaced or repaired. The materials in the helmets reduce or eliminate trauma to the human skull and cranial regions by dissipating the force of a blow throughout the material, which often breaks apart or is severely weakened as a result.

Conventional shock absorption systems are inefficient because they must be replaced or repaired after an impact or concussive force is sustained. The inner protective rubber, foam, or other padding lining of a crash helmet may be significantly damaged, regardless of whether the hard outer layer is damaged by impact or concussive force. Structural damage to the inner lining eliminates the material strength and shock absorption and dissipation capabilities of convention systems. Further, conventional techniques do not evenly dissipate energy from impact or concussive force.

One particular industry interested in the development of such systems is the United States military. In November 2007, the Army issued a request for information seeking a technology solution that would increase blunt impact protection over the then-current performance standard. At the time, the testing standard for blunt impact protection required that a helmet dropped at a speed of 10 feet per second be able to diminish the force to which the wearer's head accelerates to under 150 g. The request for information called for the same degree of protection at a drop speed of 14.1 feet per second, with the ultimate objective of increasing this drop speed to 17.3 feet per second. As of July 2009, no manufacturer had developed a pad system passing the 14.1 feet per second test.

BRIEF SUMMARY OF THE INVENTION

The present invention presents a cranial shock absorption system that improves on existing technology due to its capability to withstand higher concussive forces and meet the United States military standards referenced above at a drop speed of 14.1 ft/sec. The inventor has found that the system described herein provides an improvement over existing technology in preventing head trauma resulting from concussive impact in that it absorbs and dissipates impact energy and concussive forces without the limitations of conventional techniques.

One aspect of the present invention is a cranial shock absorption system comprising a helmet shell having an interior surface, and at least one bladder secured to the interior surface of the shell. The bladder comprises silicone- or thermoplastic-elastomer first and second layers that are connected to form at least one chamber therebetween. The chamber contains a volume of fluid pressurized to between five to fifteen psig, inclusive. By forming elements of the system using a silicone or thermoplastic elastomer, the bladder is resistant to break down resulting from perspiration, oil, grease, and other agents likely to be found in the environments where the invention is likely to be used.

Another aspect of the present invention is a method of manufacturing a shock-absorbing bladder for use in a protective helmet. The method includes forming a first layer of elastomer having a top surface; positioning a thin layer of material on the top surface of the first layer of elastomer, wherein the surface area of a bottom surface of the thin layer of material is less than the surface area of the top surface of the first layer of elastomer material, and wherein the thin layer of material is positioned such that a portion of the top surface is exposed around the entire exterior of the layer of material; allowing the first layer to partially set; positioning a portion of a tubular stem or valve on the first layer adjacent to the layer of material to provide a communication path through the tubular stem; forming a second layer of elastomer over the first layer, the thin layer of material, and the portion of the stem positioned on the first layer; allowing the first layer and the second layer to fully set around the thin layer of material and the tubular stem portion; removing the thin layer of material from between the first layer and the second layer through the tubular stem to form a chamber between the first layer of elastomer and the second layer of elastomer; and introducing a fluid into the chamber through the tubular stem.

Yet another aspect of the present invention is a cushioning system for a protective helmet that comprises at least one silicone- or thermoplastic-elastomer body having a sealed interior chamber that is pressurized with a fluid; at least one layer of foam padding secured to an exterior surface of the elastomer body forming at least one cushion assembly, with the cushion assembly being shaped for attachment to the interior surface of a protective helmet.

DETAILED DESCRIPTION OF THE INVENTION

Figure 1:
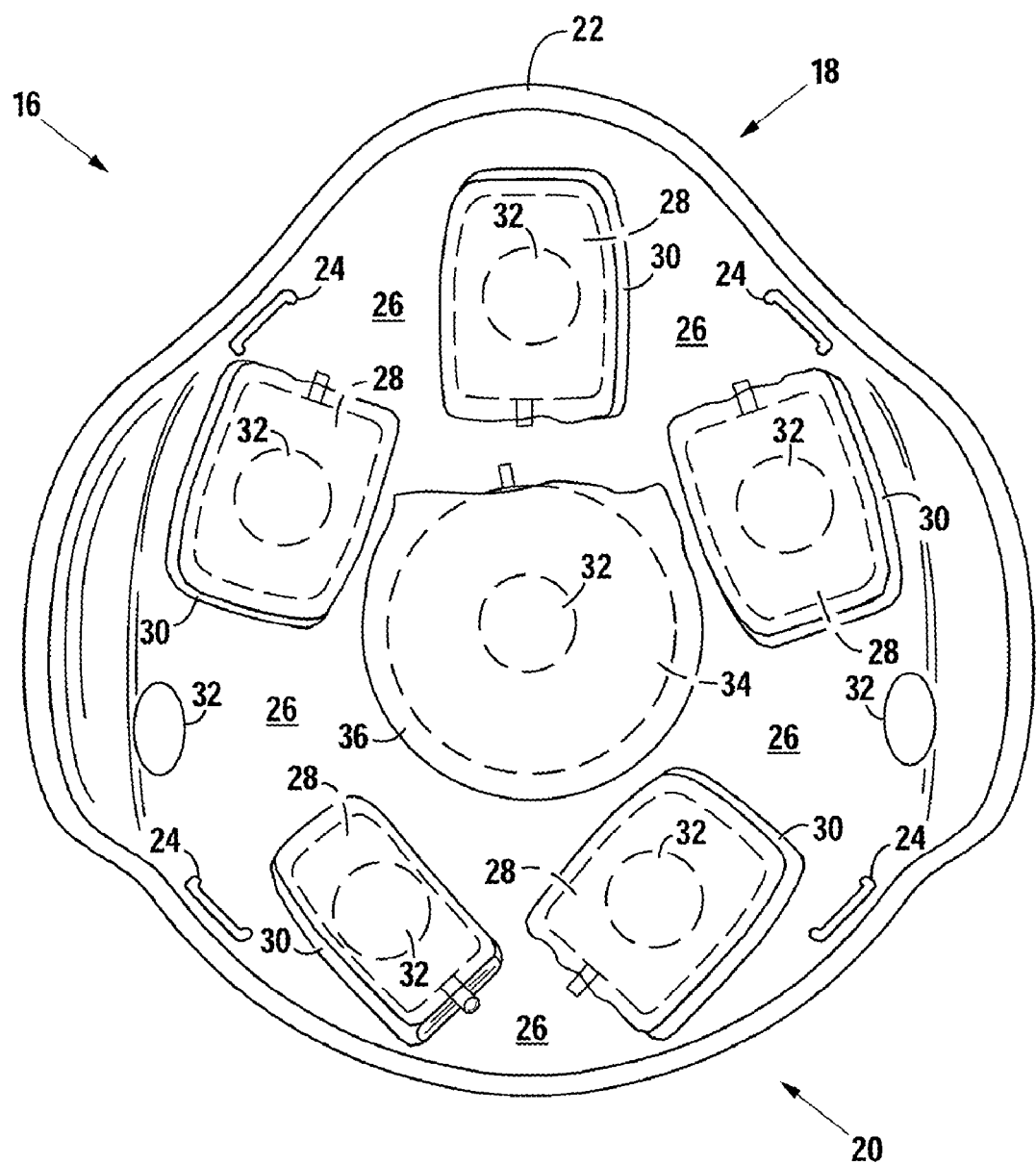
FIG. 1 is a bottom elevation view of a system having the features of the present invention and comprising a plurality of silicone elastomer bodies formed as bladders.

FIG. 1 is bottom elevation view of a protective combat helmet 16 having features of the preferred embodiment of the present invention. The helmet 16 has a front end 18 and a rear end 20, and comprises an outer shell 22 formed of a composite material and shaped for placement on a soldier's head. Anchor points 24 for straps are fixed to an interior surface 26 of the shell 22. In this embodiment, a helmet cushioning system preferably is composed of five generally rectangular silicone-elastomer cushion assemblies 28, each comprising a bladder 29 (see FIG. 2) that is a silicone elastomer body and a foam padding layer 60 (see FIGS. 6-7). Each assembly 28 is substantially enclosed by a fire retardant covering 30 and secured to the interior surface 26 with circular "hook" fasteners 32, such as those that typically used in hook-and-loop type fastener. The outer surfaces of the coverings 30 behave like "loop" in a hook-and-loop type fastening mechanism. This cushioning system further comprises a generally-circular cushion assembly 34, also comprising a silicone elastomer bladder and foam padding layer, and is substantially enclosed by a generally circular fire retardant covering 36. The covering 36 is secured to the crown area of the interior surface 26. Although this embodiment discloses six cushion assemblies (five rectangular assemblies 28 and one circular assembly 36), it is anticipated that other embodiments could incorporate a fewer or greater number of cushion assemblies of different shapes and sizes depending upon the shape, size and intended use of the helmet.

Figure 2:
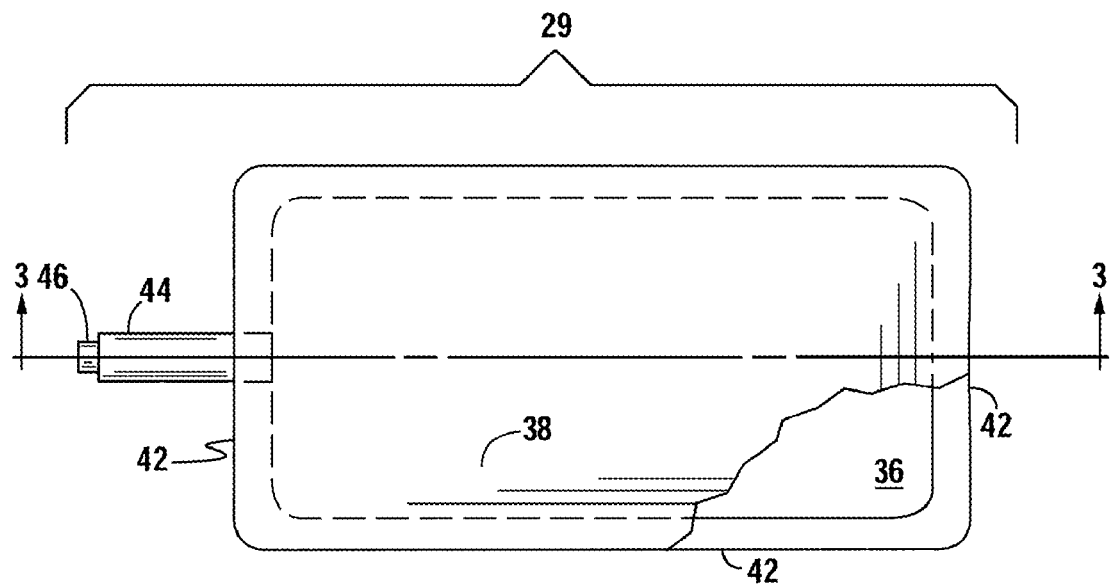
FIG. 2 is a top partial sectional view of one of the bladders shown in FIG. 1, with a cutaway portion showing the chamber.
Figure 3:
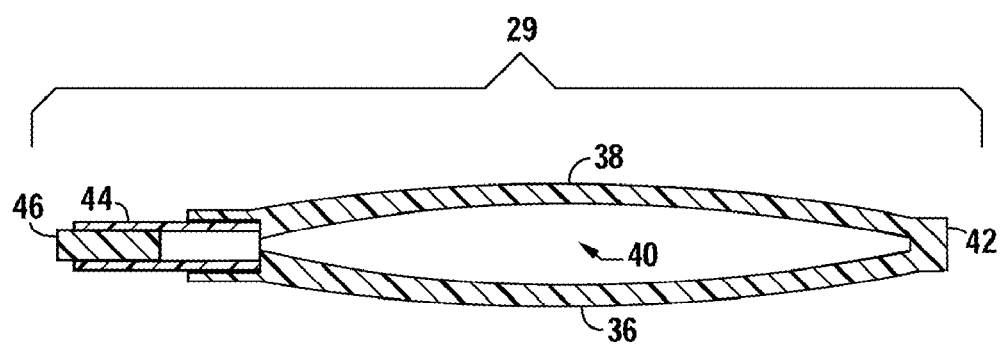
FIG. 3 is a side sectional view through section line 3-3 of FIG. 2.

FIG. 2 and FIG. 3 show a bladder 29 of a generally rectangular cushion assembly 28 of the preferred embodiment shown in FIG. 1. The bladder 29 comprises a first layer 36 of silicone elastomer integrally formed with a second layer 38 of silicone elastomer to form a chamber 40. In this embodiment, the integral formation between the first and second layers 36, 38 forms a sidewall 42 around the chamber 40. However, it is anticipated that the integral formation of the layers 36, 38 of silicone elastomer may form various shapes. For example, the layers 36, 38 may be integrally formed into a pointed or rounded edge.

A tubular stem 44 protrudes through the sidewall 42 at an end of the bladder 29. The stem 44 is sealed with a plug 46 to substantially isolate the pressure within the chamber 40 from the pressure exterior of the bladder 29. In alternative embodiments, a one-way fill valve may be substituted for the stem 44 and plug 46.

Preferably, the chamber 40 is pressurized with a fluid (e.g., air) to between ten and twelve psig (inclusive) causing the chamber 40 and bladder 29 to inflate and expand. It is anticipated, however, that the range of pressure in the bladder 29 could be between five to fifteen psig (inclusive). "Fluid," as used herein means a gas, a liquid, or some combination of the two. When the chamber 40 and bladder 29 are not inflated, the first and second layers 36, 38 each have a preferred thickness of one-fifth of an inch. It is anticipated, however, that each of the layers 36, 38 have a thickness between one-eighth of an inch and one-quarter of an inch, inclusive.

The fluid is selected so as to not be absorbable or otherwise reactive with the silicone elastomer layers 36, 38. Liquid silicone oil, for example, is not suitable for this application because it can be absorbed by the silicone elastomer layers 36, 38, which causes both degradation of the layers as well as pressure alteration of the chamber 40 over time as the silicone oil is absorbed.

In this embodiment, the silicone elastomer is a platinum cure silicone compound having the following characteristics: (a) mixed viscosity (ASTM D-2393) of 30,000 cps; (b) specific gravity (ASTM D-1475 of 1.08 g/cc; (c) specific volume (ASTM D-1475) of 25.7 cu. in./lb.; (d) pot life (ASTM D-2471) of forty five minutes; (e) cure time of sixteen hours; (f) tensile strength of five hundred to one-thousand psig, (g) a Shore A hardness of 10 to 30 A; (h) 100% modulus (ASTM D-412) of 86 psig; (i) a percentage of elongation at break of 364% to 1000%; (j) Die B Tear Strength (ASTM D-624) of 108 pli; and (k) shrinkage (ASTM D-2566) of less than 0.0001 in./in.

In the preferred embodiment, an antibacterial agent is added to the silicone elastomer in a preferred ratio of antibacterial agent to silicone elastomer of 1:40 by volume. The antibacterial agent is polychloro phenoxy phenol. It is anticipated, however, that there may be no antibacterial agent or other antibacterial agents could be used in varying volumes.

Figure 4:
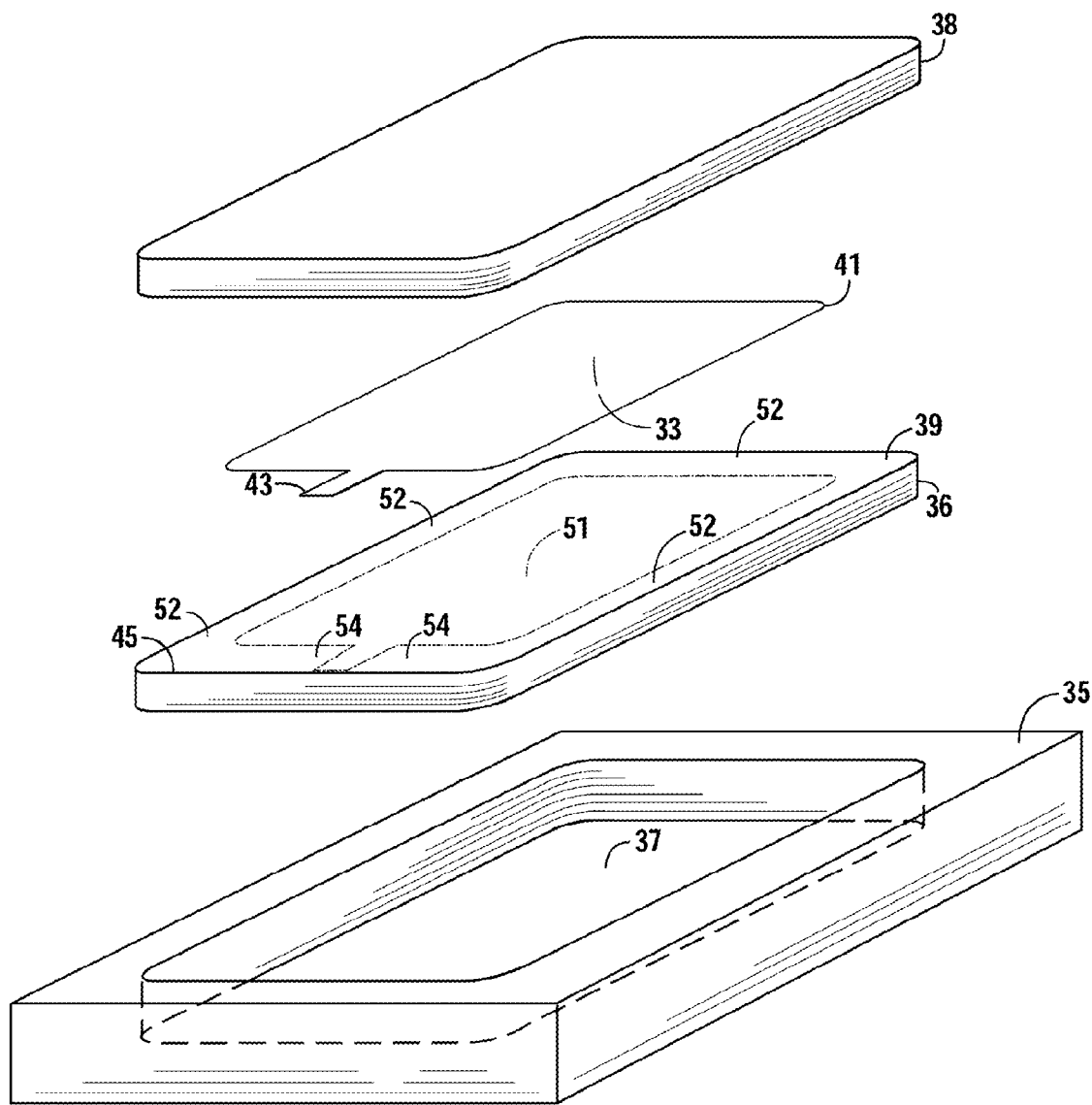
FIG. 4 and FIG. 5 show a preferred method of manufacturing the silicone elastomer bladders.

As shown in FIG. 4, the bladders 29 described with reference to FIGS. 1-3 are preferably formed in the following manner. Initially, the first layer 36 of silicone elastomer, such as a platinum cure silicone compound, is poured into a mold 35 having a cavity 37 of desired shape (e.g., rectangular, keystone, circular). Although shown as having a definite form in FIG. 4 for clarity, the first layer 36 is initially in a liquid state. Only after pouring into the cavity 37 does the first layer take the form shown in FIG. 4.

After pouring, the first layer 36 is allowed to partially set. A typically partial setting time is approximately thirty minutes, with the objective being that the first layer 36 will support a thin layer of material placed on its top surface while still allowing an additional layer of silicone elastomer to integrally form with the first layer 36. An antibacterial agent, such as polychloro phenoxy phenol, may optionally be mixed with the silicone elastomer.

After pouring and partially setting, the first layer 36 of silicone elastomer will have a top surface 39 that is not in contact with the mold 35. A thin layer 41 of material is thereafter positioned on the top surface 39 within an interior surface area 51.

The thin layer 41 of material is preferably geometrically similar in shape to the top surface 39 of the first layer 36 of silicone elastomer, but has a bottom surface 33 with a smaller surface area than the top surface 39 so that, an outer surface area 52 remains exposed around at least a substantial portion of the perimeter of the thin layer 41 of material.

In this preferred method of formation, the thin layer 41 also has a tab 43 having an end positioned at an edge 45 of the top surface 39. Except for where the tab 43 is in contact with the top surface 39, the outer surface area 52 entirely surrounds the inner area 51 and is not in contact with the thin layer 41 of material. Ends 54 of the outer surface area 52 are adjacent to the tab 43.

Minimizing the thickness of the thin layer 41 of material allows the combined thickness of the first and second layers 36, 38 to approach the total thickness of the bladder 29. Preferably the thin layer 41 of material is a biaxially-oriented polyethylene terephthalate, or boPET, film, which is commonly sold under the trade name MYLAR, and has a thickness of between thirty eight and forty five ten-thousandths of an inch. It is anticipated, however that other suitable materials may be used.

The second layer 38 of silicone elastomer is thereafter poured into the mold 35 over the first layer 36 and the thin layer 41 of material. Although shown as having a definite form in FIG. 4 for clarity, the second layer 38 is initially in a liquid state. The first and second layers 36, 38 are then allowed to completely set with the second layer 38 integrally forming with the first layer 36.

Figure 5:
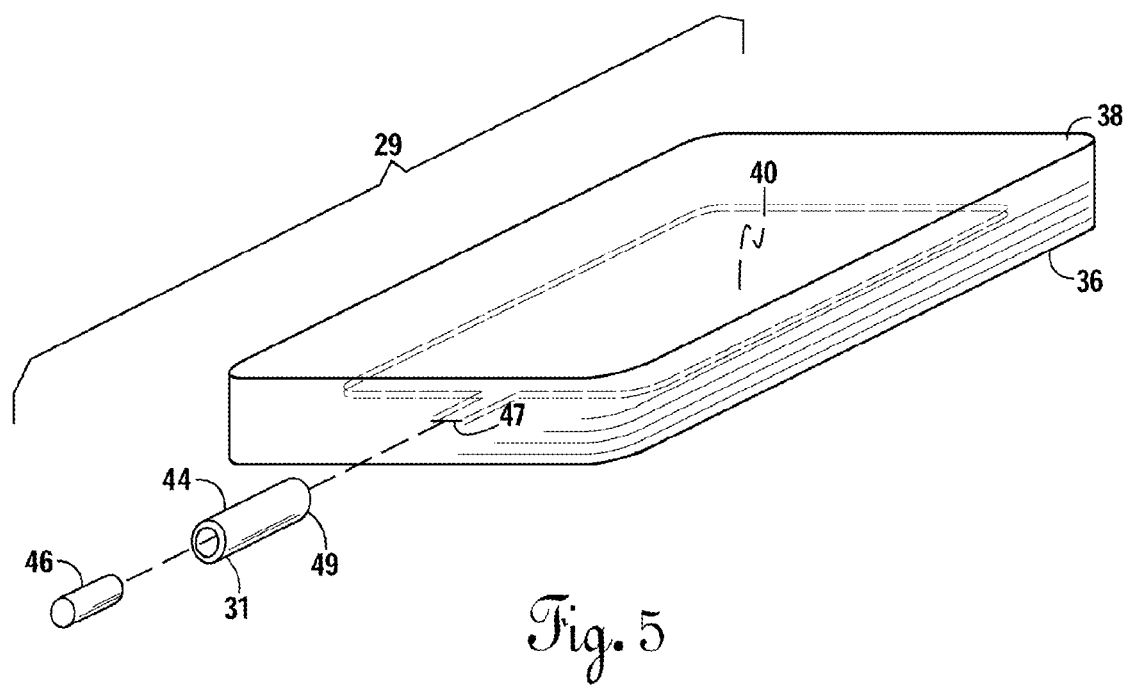

As shown in FIG. 5, as the first and second layers 36, 38 set, the placement of the tab at the edge of the top surface causes a rectangular opening 47 between the integrated first and second layers 36, 38 of material. After the first and second layers 36, 38 completely set, the thin layer 41 of material (not shown) is removed by pulling the thin layer 41 of material through the opening 47. Removal of the thin layer 41 of material leaves a chamber 40 between the first and second layers 36, 38 of silicone elastomer. The resulting chamber 40 has the same negligible thickness (as compared to the thickness of the first and second layers 36, 38) and shape as the thin layer 41 of material at the time the second layer 38 was poured, and the chamber 40 is in fluid communication with the exterior of the bladder through the opening 47. A tubular stem 44 is coated with a silicone epoxy and pressed into the opening 47 to provide a fluid communication path to the chamber 40 from the exterior of the bladder 29. A first end 31 of the tubular stem 44 is exposed to the exterior of the bladder 29 and the second end 49 is exposed to the chamber 40.

A fluid, which is preferably air, is then introduced into the chamber 40 under pressure. In the preferred embodiment, the chamber pressure is increased to between ten to twelve psig, which causes the first and second layers to expand outerwardly. The stem 44 is then sealed with a plug 46 to maintain the pressure within the chamber 40. In alternative embodiments, the chamber pressure may be increased to a range between five and fifteen psig (inclusive), and a one-way fill valve (such as those used to inflate tires) may be substituted for the stem 44 and plug 46.

Figure 6:
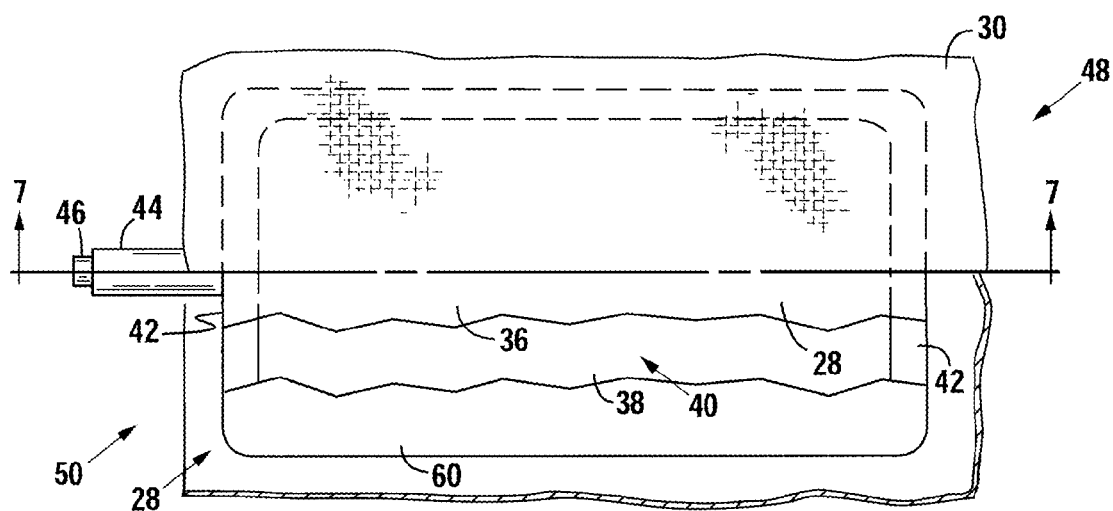
FIG. 6 is a top partial sectional view of a second-described embodiment of a cushion assembly of the present invention.
Figure 7:
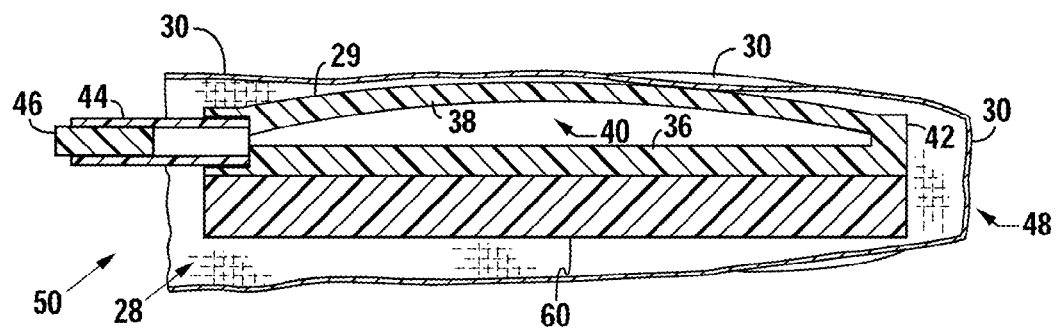
FIG. 7 is a side sectional view of through section line 7-7 of FIG. 6.

FIG. 6 and FIG. 7 show a cushion assembly 28 of the preferred embodiment substantially enclosed by a fire retardant covering 30. A foam padding layer 60 is adhered to the first layer 36 of the bladder 29 using a suitable bonding agent. The foam padding layer 60 is made of ethylene vinyl acetate (EVA) cut to match the shape of the bladder 29. The thickness of the foam padding layer 60 is preferably one-half inch. It is anticipated, however, that the thickness could be with a range of between one-eighth inch and three-quarters of an inch thick (inclusive). It is further anticipated that the foam padding layer could be formed any number of suitable foam materials, including closed-cell extruded polystyrene foam or expanded rubber.

The fire retardant covering 30 has a closed end 48, and an open end 50 through which the cushion assembly 28 may be inserted. In the preferred embodiment, the covering 30 is made of a flame resistant meta-aramid material. Alternative embodiments contemplate the cushion assembly 28 used without the fire retardant covering 30.

When the helmet 16 takes a concussive blow, the bladders 29 absorb at least a portion of the force of the helmet that would otherwise act on the head of the wearer. The configuration of the bladder 29 as described above, and in combination with the properties of the silicone elastomer, cause compression and lateral expansion of the bladder 29 to dissipate the kinetic energy of the blow, and its elastic properties return the bladder 29 to its initial shape. The foam padding layer 60 further serves to lessen the forces of the concussive impact on the wearer's head and adds comfort for the wearer.

The following table shows test results for this embodiment of the invention. A helmet having the features of the invention was mounted to a Size C magnesium headform for testing and secured using a retention system. The position of the headform was adjusted to allow for impact of the helmet at the desired location, including the front, crown, back, and side. All testing was done using a hemispherical anvil. The drop height was adjusted to achieve the desired impact velocity, which was measured just prior to impact. During testing, the peak acceleration for each impact was recorded:

| Test No. | Test Location | Peak Acceleration (g) | Impact Velocity (ft/sec) |
| --- | --- | --- | --- |
| 1 | Crown | 58 | 14.21 |
| 2 | Crown | 61 | 14.21 |
| 3 | Crown | 79 | 17.04 |
| 4 | Crown | 79 | 17.03 |
| 5 | Front | 113 | 14.23 |
| 6 | Front | 82 | 14.20 |
| 7 | Front | 111 | 17.05 |
| 8 | Front | 112 | 17.05 |
| 9 | Rear | 125 | 14.22 |
| 10 | Rear | 114 | 14.23 |
| 11 | Rear | 156 | 17.04 |
| 12 | Rear | 150 | 17.04 |
| 13 | Left Side | 97 | 14.22 |
| 14 | Left Side | 61 | 14.23 |
| 15 | Left Side | 92 | 17.07 |
| 16 | Left Side | 124 | 16.08 |

Figure 8:
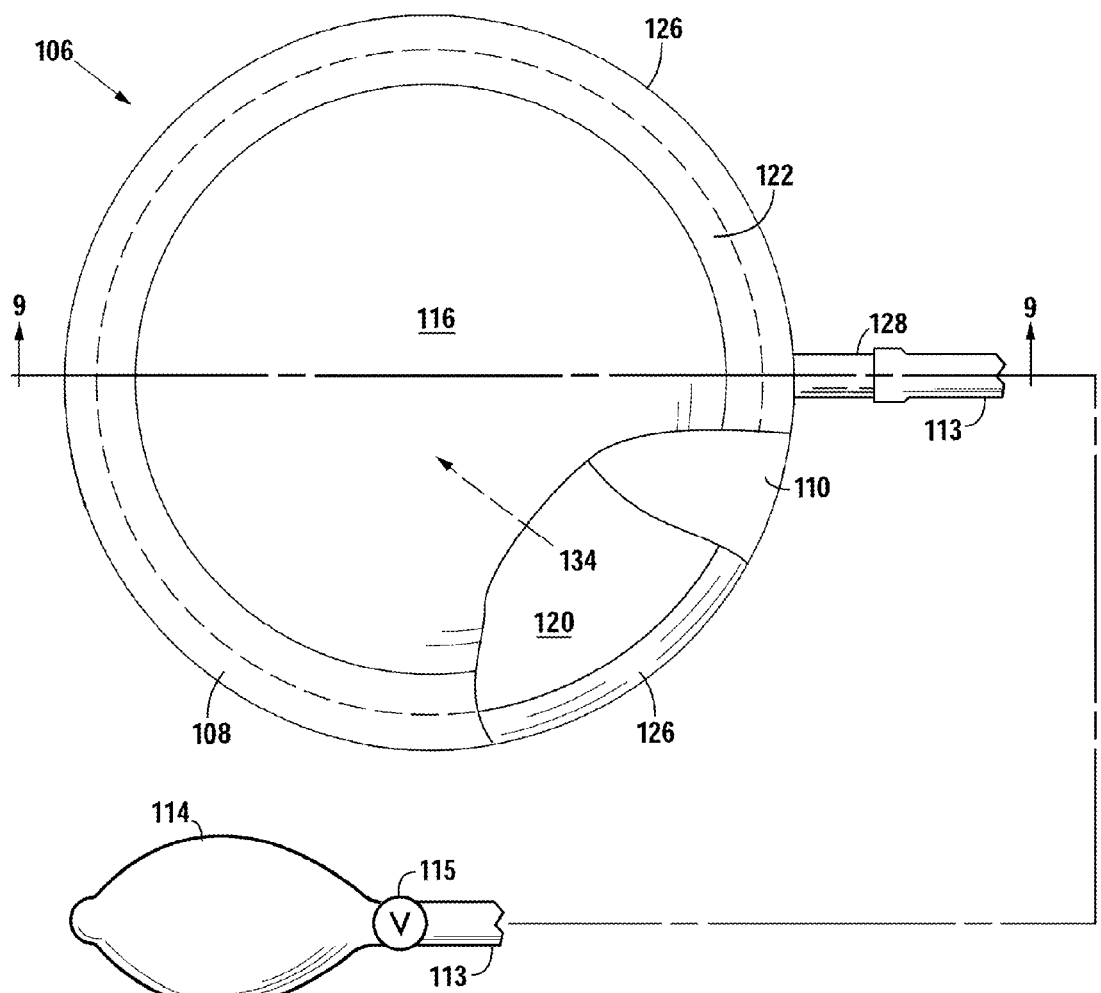
FIG. 8 is a top elevation of an alternative embodiment of a cushion assembly of the present invention.
Figure 9:
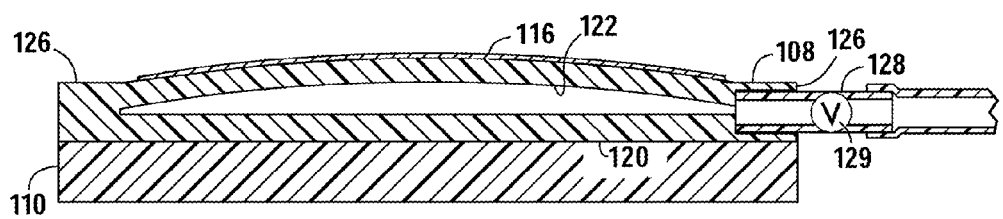
FIG. 9 is side sectional elevation through section line 9-9 of FIG. 8.

FIGS. 8-9 depict an alternative embodiment for a cushioning assembly. Because any pressurized body tends to depressurize over time or depressurizes due to the changes in atmospheric pressure or temperature, this embodiment includes a hand pump 114 in association with a one-way valve 115 to allow a wearer to re-pressurize the cushioning assembly 106 through tubing 113.

As shown in FIG. 8, the cushion assembly 106 is circularly shaped. It is anticipated, however, that the cushion assemblies of the embodiment could vary in size and shape depending on the application. The cushion assembly 106 comprises a silicone-elastomer body 108 having a sealed interior chamber 134 that is pressurized with a fluid as described with reference to FIGS. 2-3. The cushion assembly 106 also includes a foam padding layer 110 secured to an exterior surface of the silicone-elastomer body 108. A patch 116 of hook or loop material is adhered to the exterior surface of each of the silicone elastomer bodies 108 for securing to the corresponding hook or loop material adhered to the interior surface of a protective helmet.

As shown in FIG. 9, the cushion assembly 106 comprises a silicone elastomer body 108 formed as a bladder having a first layer 120 and a second layer 122. In this embodiment, the first and second layers 120, 122 are integrally adhered at their outer edges forming a sidewall 126 to create the chamber 134 between the first and second layers 120, 122. In an uninflated state, the first and second layers 120, 122 each have a thickness of approximately one-fifth of an inch, although the thickness will decrease as the chamber 134 is inflated causing the first and second layers 120, 122 to stretch. It is anticipated, however, that each of the layers 120, 122 have a thickness between one-eight of an inch and one-quarter of an inch, inclusive. The first and second layers 120, 122 and sidewall 126 are formed of a silicone elastomer mixed with an antibacterial agent (e.g., polychloro phenoxy phenol) in a ratio of 1:40 by volume. The tubular valve stem 128 having a one-way valve 129 protrudes through the sidewall 126 of the bladder.

The hand pump 114 and valve 115 are in fluid communication with the interior chamber 134 of the cushion assembly 106 through tubing 113. The wearer may adjust the pressure of the cushioning assembly 100 by using the hand pump 114 and valve 115 with the valve 128 of the cushion assembly to be inflated or deflated.

The foam padding layer 110 is adhered to the first layer 120 using a suitable bonding agent. The foam padding layer 110 is made of ethylene vinyl acetate cut to match the shape of the silicone elastomer body 108. The thickness of the foam padding layer 110 is preferably one-half inch. It is anticipated, however, that the thickness could be with a range of between one-eighth inch and three-quarters of an inch (inclusive). In alternative embodiments, hook-and-loop fasteners may secure the foam padding layer 110 to the first layer 120.

Figure 10:
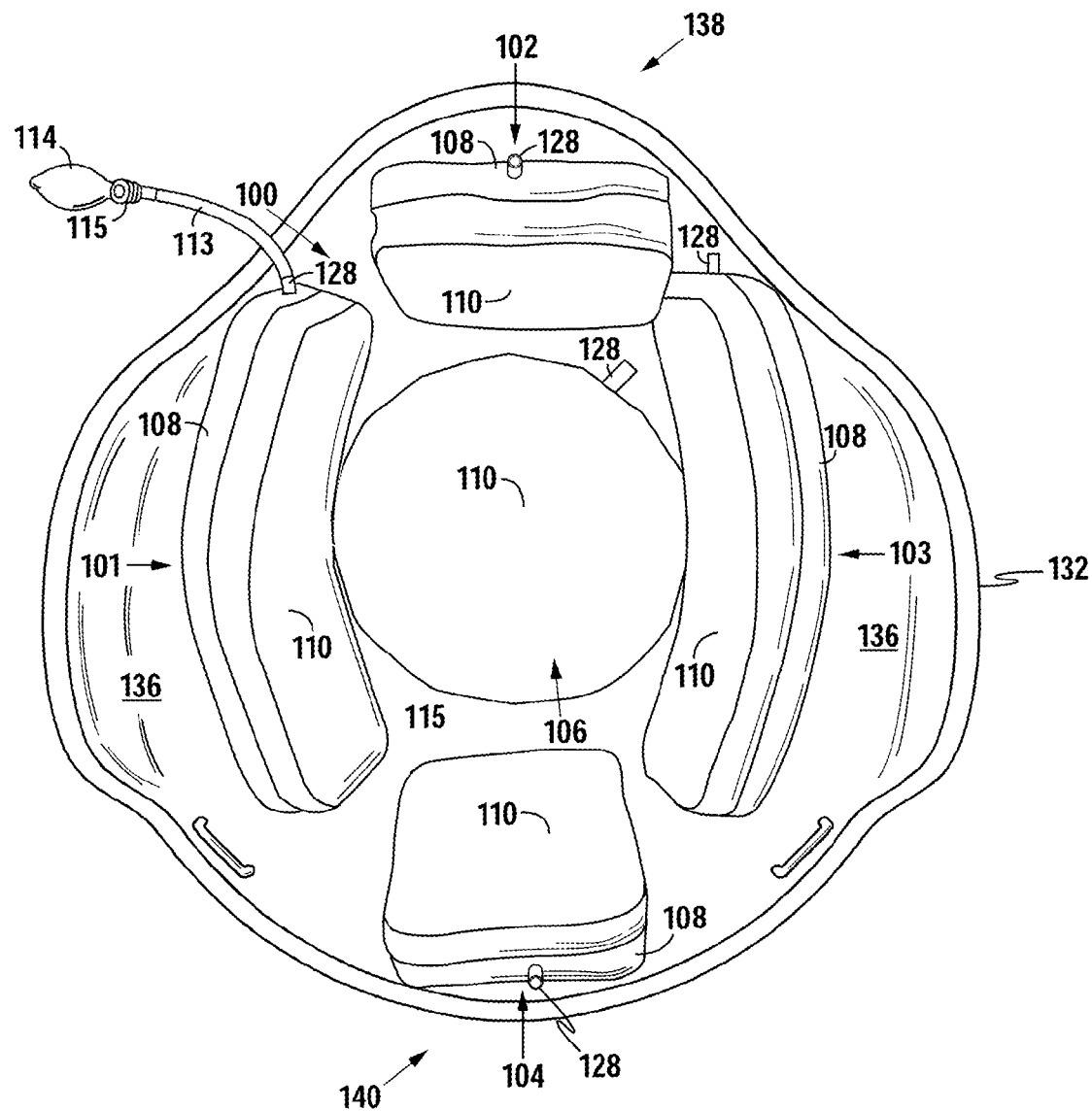
FIG. 10 is a bottom elevation of a cushioning system positioned in a protective combat helmet.

FIG. 10 shows a bottom elevation of a cushioning system 100 placed in a combat helmet shell 132 having an interior surface 136. The central cushion assembly 106 is positioned adjacent the crown area of the shell 132. First and third cushion assemblies 101, 103 are orientated along the sides of the interior surface 136. Second and fourth cushion assemblies 102, 104 are secured to the front portion 138 and rear portion 140 of the interior surface 136, respectively. In this embodiment, the silicone elastomer bodies 108 contact and conform to the contour of the interior surface 136. Although thus far described with the foam padding layers 110 of the various cushion assemblies 101-104 being positioned between the wearer of the helmet shell 132 and the silicone-elastomer bladders 108, alternative embodiments contemplate the silicone-elastomer bladders 108 as being positioned between the wearer of the helmet and the foam padding layers 110 when worn.

Although thus far described with reference to a combat helmet, the present invention is useful in other applications as well, such as sports equipment. While the combat applications may require planning for fires and explosive events desiring in the use of a flame retardant materials, sports equipment contemplates no necessity for such materials, and may preferably replace the coverings described supra with a vinyl coating as either a single vinyl covering encloses all of the cushion assemblies a separate vinyl covering for each of cushion assembly.

Figure 11:
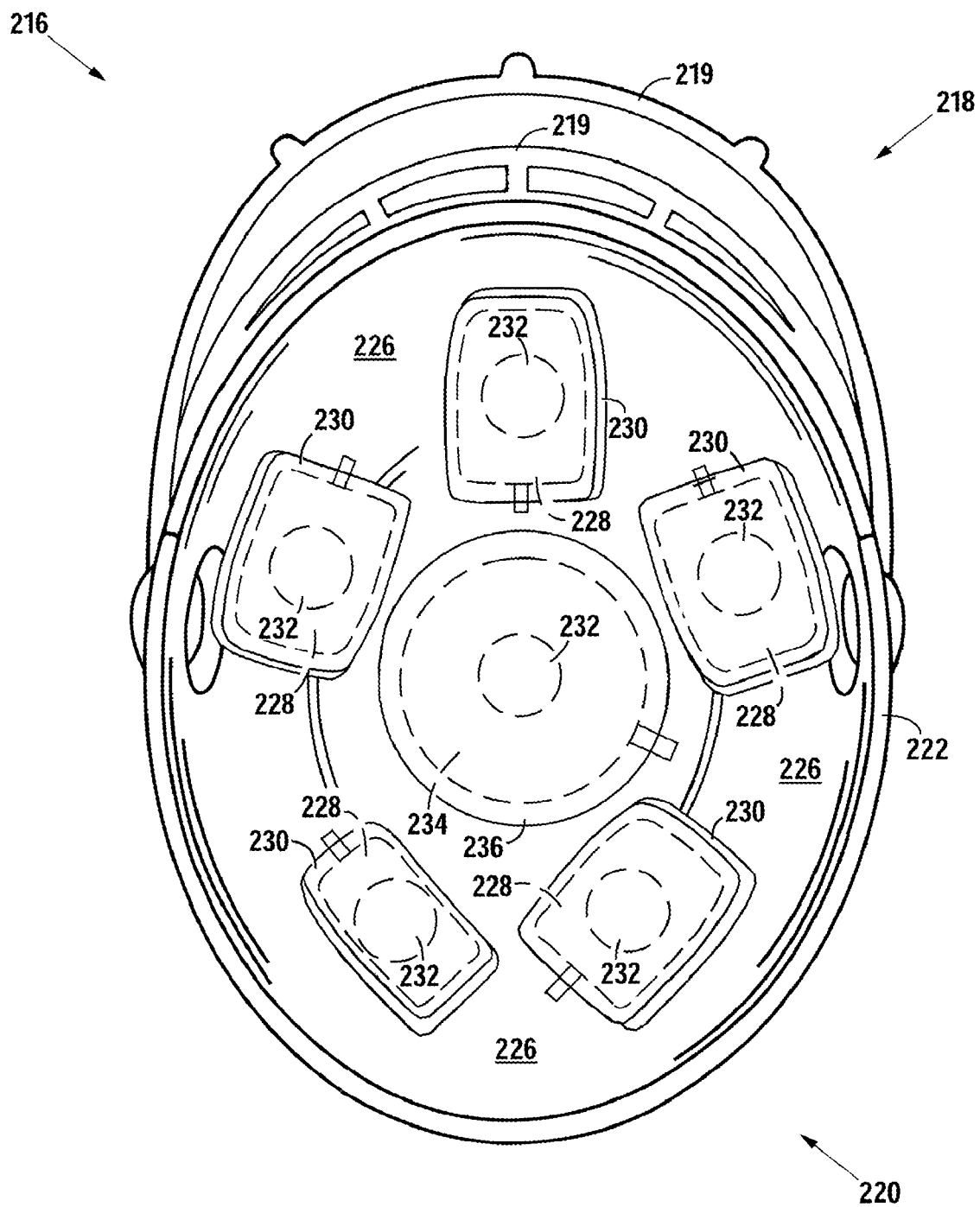
FIG. 11 is a bottom elevation of yet another embodiment of the present invention incorporated into a sports helmet.

FIG. 11, for example, shows another embodiment of a cushioning system positioned within a sports helmet such as a football helmet 216, or a baseball, lacrosse, racing, hockey, horseracing, or equestrian helmet (not shown). The football helmet 216 has a front end 218 with a facemask 219, a rear end 220, and an outer shell 222 having an interior surface 226. The shell 222 is formed of a composite material and shaped for placement on an athlete's head.

Five generally rectangular cushion assemblies 228, each having a silicone elastomer bladder and foam padding layer as described above, are substantially covered by vinyl coatings 230 and secured to the interior surface 226 with circular hook-and-loop fasteners 232. A generally circular cushion assembly 234 is substantially covered by a vinyl coating 236, which is secured to the crown area of the interior surface 226 with a circular hook-and-loop fastener 232.

When the football helmet 216 takes a concussive blow, the bladders 228, 234 absorb at least a portion of the force of the helmet 216 that would otherwise act on the head of the wearer. The configuration of the bladders 228, 234 as described above, and in combination with the properties of the silicone elastomer, cause compression and lateral expansion of the bladders 228, 234 to dissipate the kinetic energy of the blow, and its elastic properties return the bladders 228, 234 to their original shape. The foam padding layers further serve to lessen the force concussive impact on the wearer's head.

Figure 12:
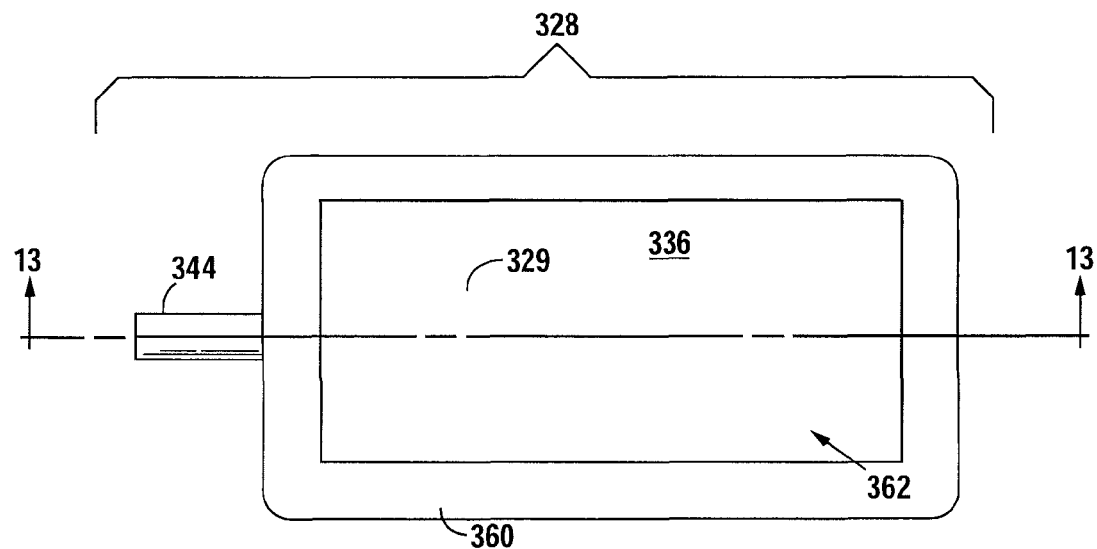
FIG. 12 is a bottom elevation of an alternative embodiment of a cushion assembly of the present invention.
Figure 13:
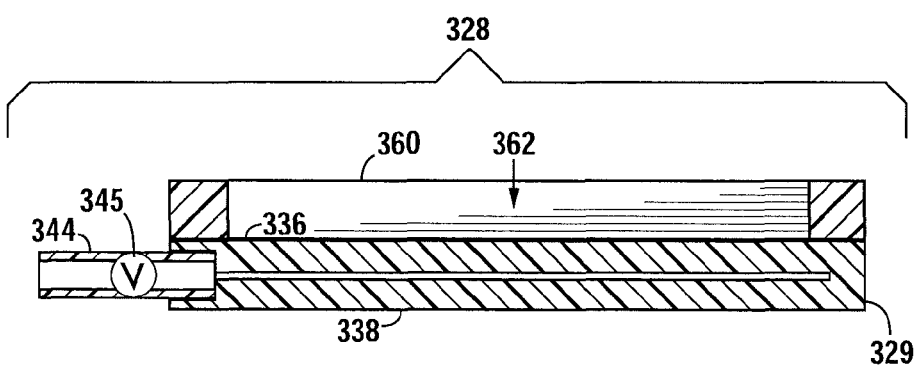
FIG. 13 is a side sectional view through section line 13-13 of FIG. 12.
Figure 14:
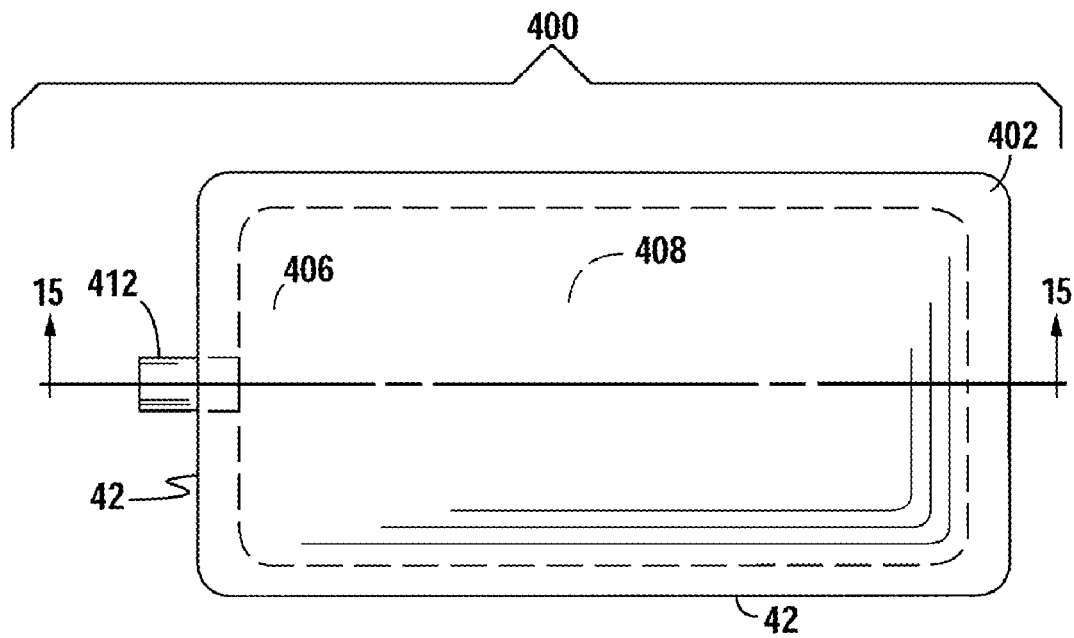
FIG. 14 is a top partial sectional view of a yet another alternative embodiment of a cushion assembly of the present invention.

FIG. 12 and FIG. 13 show a cushion assembly 328 of an alternative embodiment of the present invention. The cushion assembly 328 is shown in an uninflated state, but may be inflated through the one-way fill valve 345 positioned in the valve stem 344.

The cushion assembly 328 comprises a bladder 329 having a first layer 336, a second layer 338, and a foam padding layer shaped as a collar 360 and adhered to the first layer 336 of the bladder 329 using a suitable bonding agent. Although not shown, the cushion assembly 328 is substantially enclosed by a fire retardant covering as described supra. Alternative embodiments of the cushion assembly 328 anticipate that a second foam padding collar identical to the foam padding layer 360 may be adhered to the second layer 338 of the bladder.

Preferably, the foam padding collar 360 is made of EVA foam with an opening 362 through its middle. The perimeter of the collar 360 substantially matches the shape of the perimeter of the bladder 329. When the bladder 329 is inflated, the first layer 336 expands into and partially fills the opening 362 in the collar 360. The thickness of the foam padding collar 360 is preferably one-half inch. It is anticipated, however, that the thickness could be within a range of between one-eighth inch and three-quarters of an inch thick (inclusive).

Figure 15:
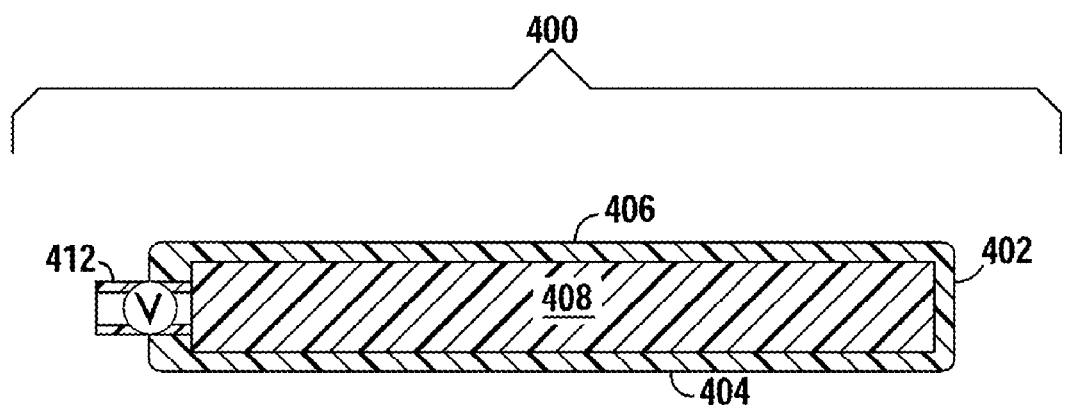
FIG. 15 is a side sectional view through section line 15-15 of FIG. 14.

FIGS. 15-16 disclose another embodiment of a cushion assembly 400 of the present invention. The cushion assembly 400 comprises a bladder 402 having a first layer 404 of thermoplastic elastomer, a second layer 406 of thermoplastic elastomer, a chamber formed between the first layer 404 and the second layer 406, and a foam padding layer 408 encapsulated within the chamber. The foam padding layer 408 is made of EVA foam and is generally-rectangular. The thickness of the foam padding layer 408 is preferably one-half inch. It is anticipated, however, that the thickness could be with a range of between one-eighth inch and three-quarters of an inch thick (inclusive). Although not shown inflated, the bladder 402 may be filled with a fluid, such as air, through a one way fill valve 412.

Encapsulating the foam padding layer 408 within the bladder 402 decreases the time required for the cushion assembly 400 to return to its pre-impact shape after receiving a concussive impact. As the cushion assembly 400 is impacted, the bladder 402 dissipates a portion of the energy and compresses against the foam padding layer 408. The remaining energy is absorbed by the combination of the elastomeric first layer 404 in contact with the foam padding layer 408.

The present invention is described above in terms of preferred illustrative embodiments of specifically-described protective helmets, cushioning systems, and method of manufacture. Those skilled in the art will recognize that alternative constructions can be used in carrying out the present invention. Other aspects, features, and advantages of the present invention may be obtained from a study of this disclosure and the drawings, along with the appended claims.

I claim:

1. A method of manufacturing a shock-absorbing bladder, the method comprising:

forming a first layer of elastomer having a top surface;

allowing said first layer to partially set;

positioning a thin layer of material having an outer edge on said top surface of said first layer of elastomer, wherein a surface area of a bottom surface of said layer of material is less than the surface area of the top surface of said first layer of elastomer material, and wherein said thin layer of material is positioned such that a portion of the top surface is exposed around at least a substantial portion of the outer edge of said thin layer of material;

forming a second layer of elastomer over said first layer and said thin layer of material;

allowing said first layer and said second layer to fully set around said thin layer of material to form a body having an outer surface;

removing said thin layer of material from between said first layer of elastomer and said second layer of elastomer to form a chamber therebetween; and introducing a fluid into said chamber.

2. The method of claim 1 further comprising:

creating an opening from said outer surface of said body to said thin layer of material; and wherein said step of removing said thin layer of material is performed by pulling said thin layer of material from between said first and second layers of elastomer through said pathway and said an opening.

3. The method of claim 2 further comprising:

positioning an end of a tubular stem through said opening; and fixing said tubular stem to said body.

4. The method of claim 3 further comprising sealing said tubular stem to prevent egress of said introduced fluid from said chamber.

5. The method of claim 1 wherein said thin layer of material comprises a tab, and wherein said step of positioning said thin layer of material further comprises locating an end of said tab at an outer edge of said top surface of said first layer of elastomer so that said tab is adjacent the outer surface of said body.

6. The method of claim 5 wherein said step of removing said thin layer of material is performed by pulling said thin layer of material from between said first and second layers of elastomer by said tab of material and thereby creating an opening from said chamber to said outer surface of said body.

7. The method of claim 6 further comprising:

positioning an end of a tubular stem through said opening; and fixing said tubular stem to said body.

8. The method of claim 7 further comprising sealing said tubular stem to prevent egress of said introduced fluid from said chamber.

9. The method of claim 1 wherein the pressure within said chamber following said step of introducing a fluid is between five and fifteen psig, inclusive.

10. The method of claim 1 further comprising mixing an antibacterial agent into said elastomer.

11. The method of claim 10 wherein said antibacterial agent is polychloro phenoxy phenol.

12. The method of claim 11 wherein the ratio of antibacterial agent to elastomer is 1:40 by volume.

13. The method of claim 1 wherein said elastomer is a platinum cure silicone compound.

14. The method of claim 1 wherein said thin layer of material is a biaxially-oriented polyethylene terephthalate film.

15. The method of claim 1 wherein said fluid is air.

16. The method of claim 9 wherein said fluid is air.

17. The method of claim 1 wherein said elastomer is a silicone elastomer.

18. The method of claim 17 further comprising:

creating an opening from said outer surface of said body to said thin layer of material; and wherein said step of removing said thin layer of material is performed by pulling said thin layer of material from between said first and second layers of silicone elastomer through said pathway and said an opening.

19. The method of claim 18 further comprising:

positioning an end of a tubular stem through said opening; and fixing said tubular stem to said body.

20. The method of claim 19 further comprising sealing said tubular stem to prevent egress of said introduced fluid from said chamber.

* * * * *